United States Patent
Yashar et al.

(10) Patent No.: US 7,864,736 B2
(45) Date of Patent: Jan. 4, 2011

(54) PACKET COMMUNICATION ROAMING METHOD AND SYSTEM

(75) Inventors: Haim Yashar, New York, NY (US);
Carmi Peleg, Moshav Shilat (IL);
Abraham Shani, Nez Tziona (IL);
Roman Kazarnovski, Modiin (IL)

(73) Assignee: TCM Mobile LLC, Overland Park, KS (US)

( * ) Notice: Subject to any disclaimer, the term of this patent is extended or adjusted under 35 U.S.C. 154(b) by 656 days.

(21) Appl. No.: 11/859,920

(22) Filed: Sep. 24, 2007

(65) Prior Publication Data

US 2009/0080381 A1    Mar. 26, 2009

(51) Int. Cl.
*H04W 4/00*     (2009.01)
*H04W 36/00*    (2009.01)

(52) U.S. Cl. ............... 370/332; 455/437; 455/438; 455/439; 455/440; 455/441; 455/442; 455/443

(58) Field of Classification Search ........... 370/331, 370/332; 455/436–444
See application file for complete search history.

(56) References Cited

U.S. PATENT DOCUMENTS

| | | | |
|---|---|---|---|
| 6,088,337 A | 7/2000 | Eastmond et al. | |
| 6,611,516 B1 | 8/2003 | Pirkola et al. | |
| 6,615,236 B2 | 9/2003 | Donovan et al. | |
| 6,628,943 B1 | 9/2003 | Agrawal et al. | |
| 6,681,252 B1 | 1/2004 | Schuster et al. | |
| 6,693,894 B1 | 2/2004 | Anderson et al. | |
| 6,732,176 B1 | 5/2004 | Stewart et al. | |
| 6,738,362 B1 | 5/2004 | Xu et al. | |
| 6,775,253 B1 | 8/2004 | Agrawal et al. | |
| 6,788,660 B1 | 9/2004 | Agrawal et al. | |
| 2002/0035699 A1 | 3/2002 | Crosbie | |
| 2003/0027595 A1 | 2/2003 | Ejzak | |
| 2003/0074470 A1 | 4/2003 | Karino | |
| 2003/0193952 A1 | 10/2003 | O'Neill | |
| 2003/0196107 A1 | 10/2003 | Robertson et al. | |
| 2003/0228868 A1 | 12/2003 | Turanyi et al. | |
| 2004/0023653 A1 | 2/2004 | O'Neill | |
| 2004/0073786 A1 | 4/2004 | O'Neill et al. | |
| 2004/0228324 A1 | 11/2004 | Alexiou et al. | |
| 2004/0240430 A1 | 12/2004 | Lin et al. | |
| 2005/0025164 A1 | 2/2005 | Kavanagh et al. | |
| 2005/0060319 A1* | 3/2005 | Douglas et al. ............... 707/10 |
| 2005/0254470 A1 | 11/2005 | Yashar | |
| 2006/0056348 A1* | 3/2006 | Marinier et al. ............. 370/331 |
| 2007/0115899 A1 | 5/2007 | Ovadia et al. | |
| 2007/0121561 A1 | 5/2007 | Yashar | |
| 2009/0052382 A1* | 2/2009 | Stephenson et al. ......... 370/329 |

* cited by examiner

*Primary Examiner*—Ronald Abelson
(74) *Attorney, Agent, or Firm*—Nixon Peabody LLP

(57) ABSTRACT

A method of roaming in a packet communication system during a call is disclosed. The method of roaming has a scanning process and a connection process. During the scanning process, one or more available access points (AP's) are scanned-for. The one or more available AP's are prioritized into a prioritized AP list based on at least one criterion in addition to a received signal strength indicator (RSSI). During the connection process, a decision is made to roam from an existing AP to a new AP. A connection is made to the new AP, wherein the new AP is selected from the prioritized AP list. Associated methods, systems, and data signals are also disclosed.

18 Claims, 6 Drawing Sheets

PACKET COMMUNICATION ROAMING METHOD AND SYSTEM

FIELD

The claimed invention relates to packet communication systems, and more specifically, to methods and systems of roaming in a packet communication system such as a voice-over-IP (VoIP) system.

BACKGROUND

The proliferation of wireless access points (AP's) which may be coupled to a wide-area network (WAN), such as the internet, or a local-area network (LAN), has made it possible to wirelessly send and receive data packets, such as TCP/IP or UDP/IP packets to and from a variety of wireless devices and wired devices which are connected to the network. A variety of protocols may be used to support the physical layer connection of the wireless devices to the AP's, for example the IEEE 802.11 protocol. At the same time that such wireless infrastructure is growing, algorithms referred to as "codecs" have been developed to sample and code conversation into voice data packets. The codecs can also decode the voice data packets and convert them into audible conversation. By combining codec technology and a wireless protocol such as 802.11 into mobile phones, such mobile phones can send and receive voice data packets via a wireless access point (AP). One type of voice data packet format which is gaining in popularity is voice-over-IP (VoIP).

FIG. 1 schematically illustrates one embodiment of a VoIP system 20 which supports a plurality of wireless (and therefore, potentially mobile) VoIP phones 22A, 22B, 22C. A plurality of access points 24A, 24B, and 24C are coupled to a VoIP core controller 26. For simplicity, the element 26 will be referred-to as a VoIP core controller, but it should be understood that element 26 can be a VoIP core controller and/or a WiFi controller. The VoIP core controller 26 coordinates the overall VoIP system 20. Each VoIP phone 22 can wirelessly connect to an AP 24, for example, using the 802.11 protocol. When the phone 22 associates with an AP 24, the phone 22 can then register with the VoIP core controller 26 via the AP 24. The VoIP core controller 26 manages IP address assignments for each of the registered devices, tracks which AP 24 the portable device is communicating through, and assists in routing data to and from the mobile phone 22. The VoIP core controller 26 may be a computer, laptop, processor, networking device, server, microprocessor, application specific integrated circuit (ASIC), analog electrical component, digital electrical component, any plurality there-of, or any combination thereof. The VoIP core controller 26 may be localized or distributed. The VoIP core controller 26 may facilitate voice conversations between multiple wireless phones 22, and may optionally be coupled to one or more public service telephone networks (PSTN) 28, for example via a voice gateway, to enable the VoIP phone 22 to make calls to more traditional phone systems, and visa-versa.

The AP's 24 may be coupled to the VoIP core controller 26 in a variety of ways. As one example, an AP 24A may be hard-wired 30 to the VoIP core controller 26, for example by an Ethernet or an ISDN connection. As another example, an AP 24B may be wirelessly connected 32 with the VoIP core controller 26, for example, by using an 2.4 GHz or a 5 GHz wireless protocol. As a further example, an AP 24C may be coupled to the VoIP core controller 26 by a network 34. The network 34 could be wide area network (WAN) or a local area network (LAN).

Each AP 24 will have an associated coverage area 36. In this embodiment, the AP coverage areas 36 are illustrated as being circular and of the same size. It should be understood, however, that the AP coverage areas 36 do not necessarily have to be circular. AP antennas may be designed to broadcast differing coverage shapes. Furthermore, AP antennas may have different power levels, which can lead to different size coverage areas, even from the same style antenna. When a VoIP mobile phone 22 (sometimes referred-to as a "client") is within the coverage area 36, it can wirelessly connect 38 to the AP 24 in the coverage area 36. If the VoIP mobile phone 22 moves outside of the coverage area 36, it can not connect to the AP 24.

Assuming, for simplicity, a circular coverage area 36, an AP 24 will typically have a coverage area 36 having a maximum radius of a few hundred feet. As compared to cellular mobile technology (such as GSM, or CDMA) which has a cellular radius of approximately 2 miles, it is apparent that VoIP-type systems must have far more AP's 24 in order to have complete coverage over a similar area. An effective VoIP system 20 will therefore have many overlapping coverage areas. Although the AP's 24 in the embodiment of FIG. 1 are not illustrated as overlapping, the coverage areas I, II, and III in the embodiment of FIG. 2 do overlap. Given the relatively close distribution of AP's which is necessary in VoIP systems in order to have overlapping coverage areas, it is likely that a user of a VoIP mobile phone who is on the move will have a frequent need to roam from one AP to another AP during a call.

FIG. 2 schematically illustrates another embodiment of a VoIP system 40. Three AP's 42, 44, 46 are illustrated in this embodiment. AP coverage area I is provided by AP 42, AP coverage area II is provided by AP 44, and AP coverage area III is provided by AP 46. AP's 42 and 44 are connected to a network 34 via respective "layer 2" switches 48 and 50, and via subnet A router 52. AP 46 is connected to network 34 via switch 54 and subnet B router 56. In this embodiment, when a VoIP mobile phone 58 moves from coverage area I to coverage area II, it can simply re-associate from the first AP 42 to the second AP 44 because the "layer 3" network address is maintained due to the common subnet A router 52 shared by the AP's 42, 44. Being able to maintain the layer 3 network address means that the IP address assigned to the VoIP mobile phone 58 does not need to change when the phone 58 re-associates with AP 44. The 802.11 specification addresses this type of re-association.

Unfortunately, IP addresses cannot always be maintained when roaming from one AP to another. For example, when a second VoIP mobile phone 60 moves from coverage area II to coverage area III, it cannot simply re-associate from the second AP 44 to the third AP 46 because the layer 3 network address cannot be maintained. AP's 44 and 46 are on different subnets, and therefore the phone 60 will need a new IP address mapped to it before it can communicate with AP 54. Unfortunately, there is no standard procedure for this type of AP transfer in the 802.11 specification or otherwise. If only the 802.11 specification is relied on for this type of roaming, then a call in-progress during a move from coverage area II to coverage area III would be dropped.

The realities of actual VoIP coverage areas exacerbate the need for a method and system to deal with wireless VoIP roaming. FIG. 3 schematically illustrates one embodiment of distributed access points (AP's) for multiple service providers and their corresponding coverage areas. In this more faithful-to-real-life example, two sets of overlapping provider VoIP coverage areas are illustrated. The dots represent AP's for a first provider, provider A. The coverage areas for each AP in provider A's network are shown as a solid line circle. The x's represent AP's for a second provider, provider B. The coverage areas for each AP in provider B's network are shown as a dashed line circle. Also thrown into the mix is a personal AP 62 which is represented by a triangle. The personal AP 62 could be someone's wireless AP in their house. The coverage area for the personal AP is shown as a partially broken circle.

Not even taking movement into account, VoIP mobile phones located in the system of FIG. 3 may be presented with a variety of connection options, depending on where they are located. Some locations will only have one connection option. For example, phone 64 can only connect to AP 66 on provider B's network, phone 68 can only connect to AP 70 on provider A's network, and phone 72 can only connect to the personal AP 62. Other phones will have multiple connection options within a single provider's network. For example, phone 74 can connect to either AP 76, AP 78, or AP 80 on provider A's network. Single providers may desire to create highly overlapping AP's (such as AP's 76, 78, 80) since the number of users who can connect to a single AP are limited. Still other phones will have multiple connection options, each for a variety of networks. For example, phone 82 can connect to AP 84 on provider A's network, AP 86 on provider B's network, or personal AP 62. Still other phones will have multiple connection options for multiple networks. For example, phone 88 can connect to AP's 90 and 92 on provider A's network and to AP's 94, 96 on provider B's network.

When one adds the complication of movement to the scenario of FIG. 3, it can be appreciated how important it will be to enable phones to roam from one AP to another in a way which does not drop phone calls. Large networks have to be divided into many subnets and therefore, permanent IP's can not be used. In addition to being able to roam, it is also important to know when to roam. Simplistic roaming decisions could be made on signal strength received from each AP, but using this alone leads to a flip-flop procedure (which results in excessive dropped voice data) when attempting to transfer between AP's with similar transmission levels. Simply transferring to the AP with the highest transmission level, based on a received signal strength indicator (RSSI) does nothing to balance the load on the system.

Therefore, it is desirable to have a packet communication roaming method and system which will enable phones to roam from one AP to another, even if IP addresses can not be maintained, the method not being susceptible to flip-flopping, and which assists in balancing the load on a packet communication system, such as a VoIP or WiFi system.

SUMMARY

A method of roaming in a packet communication system during a call is disclosed. The method of roaming has a scanning process and a connection process. During the scanning process, one or more available access points (AP's) are scanned-for. The one or more available AP's are prioritized into a prioritized AP list based on at least one criterion in addition to a received signal strength indicator (RSSI). During the connection process, a decision is made to roam from an existing AP to a new AP. A connection is made to the new AP, wherein the new AP is selected from the prioritized AP list.

A system for packet communication is also disclosed. The system has a plurality of access points (AP's), a core processor coupled to the plurality of AP's, and a mobile phone configured to connect to at least one of the AP's at a time. The core processor is configured to maintain performance information about the plurality of AP's. The core processor is also configured to create at least one performance-based-list selected from the group consisting of 1) a black list comprising a list of any of the plurality of AP's which have undesirable performance information; and 2) a white list comprising a list of any of the plurality of AP's which have desirable performance information. The mobile phone is also configured, while in a call, to execute a scanning process comprising: 1) scanning for one or more available AP's; and 2) prioritizing the one or more available AP's into a prioritized AP list based at least on RSSI and the performance-based-list. The mobile phone is further configured, while in the call, to execute a connection process comprising: 1) making a decision to roam from an existing AP to a new AP; and 2) connecting to the new AP, wherein the new AP is selected from the prioritized AP list.

A data signal is disclosed for transmission over a physical medium from a core processor to at least one mobile phone. The data signal comprises 1) a white list of recommended access points (AP's) which are recommended for connection; and 2) a black list of blocked AP's which are not recommended for connection.

Another method of roaming in a packet communication system during a call is disclosed. The method of roaming has a scanning process and a connection process. As part of the scanning process, an access point (AP) probe request is sent on one or more channels. The one or more channels are monitored for one or more AP probe responses from one or more available AP's. A current list of AP scan data is accumulated from the one or more AP probe responses. An AP signal direction is determined for each of the available AP's based on a comparison of historical AP scan data and currently accumulated AP scan data. External AP information is updated by receiving a black list and a white list, wherein the black list comprises a list of blocked AP's which are not recommended for connection, and wherein the white list comprises a list of recommended AP's. A list of AP's is prioritized based on currently accumulated AP scan data, AP signal direction, and external AP information. As part of the connection process, if a received signal strength indication (RSSI) has dropped below a roaming RSSI threshold or if a command to execute an AP change has been received, then a preferred new AP is selected from the prioritized AP list. It is determined if a new IP address will need to be assigned to a client. If the new IP address does not need to be assigned to the client, then the client is reassociated to the new AP. If the new IP address does need to be assigned to the client, then: 1) the call is put in a hold mode; 2) the client is reassociated to the new AP; 3) the new IP address is created for the client; 4) a SIP reinvite command is executed; and 5) the call is taken out of the hold mode.

Figure 1:
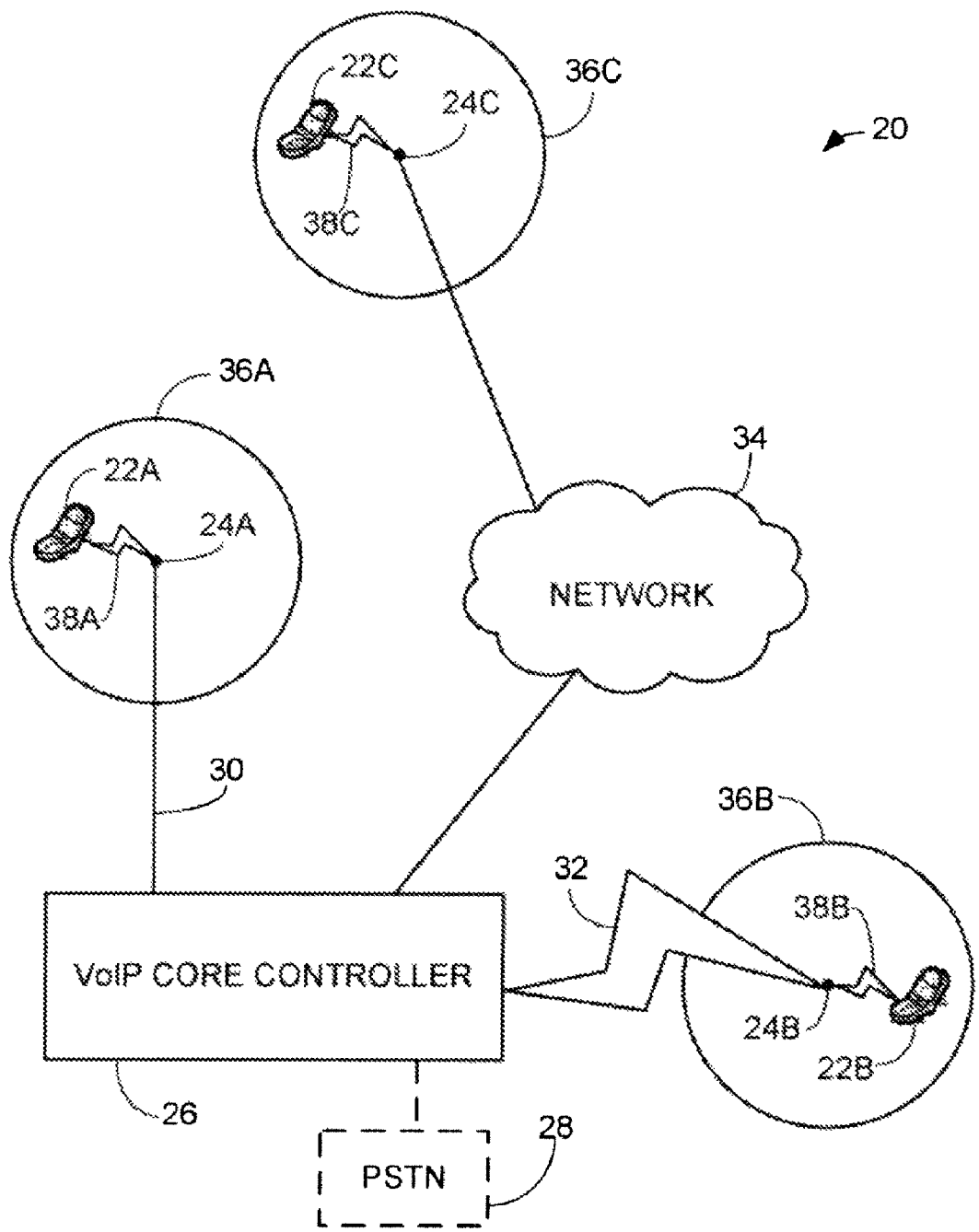
FIG. 1 schematically illustrates one embodiment of a voice-over-IP (VoIP) system.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

Figure 4:
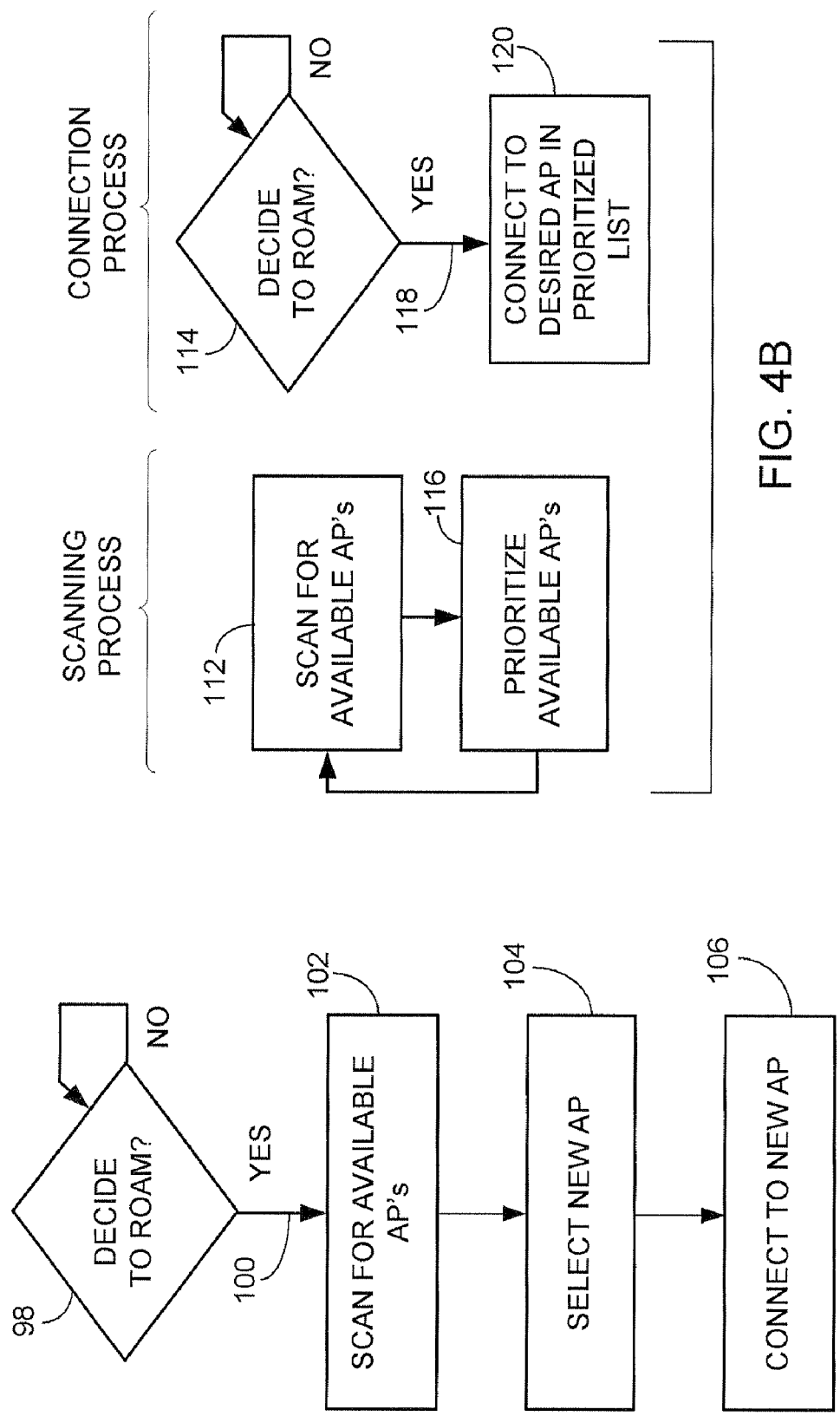
FIG. 4A illustrates one embodiment of a method of roaming in a packet communication system.
FIG. 4B illustrates another embodiment of a method of roaming in a packet communication system.

Roaming in packet communication systems is typically a "break-before-make" type of process, where the connection between a mobile device, such as a VoIP or WiFi mobile phone, and a first access point (AP) is severed before a new connection with a second AP is made. This break-before-make process occurs once the decision to roam has been made. FIG. 4A illustrates one embodiment of roaming in a packet communication system. Although many types of mobile devices could be used in a packet communication system, such as a laptop, a PDA, a WiFi mobile phone, and VoIP mobile phone, for simplicity, only a VoIP mobile phone (or "mobile phone" for short) will be referred-to in this specification. A mobile phone may have an internal decision process which is used to decide 98 when it is time to roam. When the decision has been made 100 to roam, the mobile phone can scan 102 for available AP's. This scanning process can take a significant amount of time. If the 802.11 wireless protocol is being used, for example, in North America, there are eleven possible channels which can be scanned. If passive scanning is used, where the mobile device waits to hear a beacon frame sent regularly from an AP, the mobile device should wait for approximately 100 msec per channel to allow enough time to receive beacon frames from any available AP's. If active scanning is used, where the mobile phone sends a probe request frame, the mobile phone must dwell 10-20 msec per channel in order to allow available AP's time to respond with a probe response frame. With a time of 10-100 msec per channel and up-to 11 channels, the delay in scanning for available AP's can be significant when one considers that a 50 msec delay in a voice conversation can be noticeable to the human ear. Once the scanning 102 has been completed, a new AP can be selected 104. This has traditionally been done by choosing the AP with the highest received signal strength indicator (RSSI). Finally, a connection can be made 106 to the new AP. The process illustrated in FIG. 4A is not ideal, since the scanning delays may impact the voice quality of a VoIP call, regardless of how the AP is selected and regardless of how a connection is made to the new AP.

A far superior alternative is the method of FIG. 4B which illustrates another embodiment of a method of roaming in a packet communication system. The method has two separate processes, a scanning process 108 and a connection process 110. Depending on the implementation used in a mobile phone and the hardware design of the mobile phone, the scanning process 108 and the call in progress can occur substantially in parallel or in a multiplexed fashion. The scanning process 108 and the connection process 110 occur while the mobile phone is in a call. The key advantage offered by the method of FIG. 4B is that scanning for available AP's 112 is independent of the decision on whether or not to roam 114. After scanning for available AP's 112 in the scanning process 108, the one or more available AP's are prioritized 116, preferably based on at least one criterion in addition to a received signal strength indicator (RSSI). This way, when the decision to roam 118 has been made, the mobile phone can immediately take a high-priority AP from a prioritized list of available AP's and connect to it 120.

Figure 5:
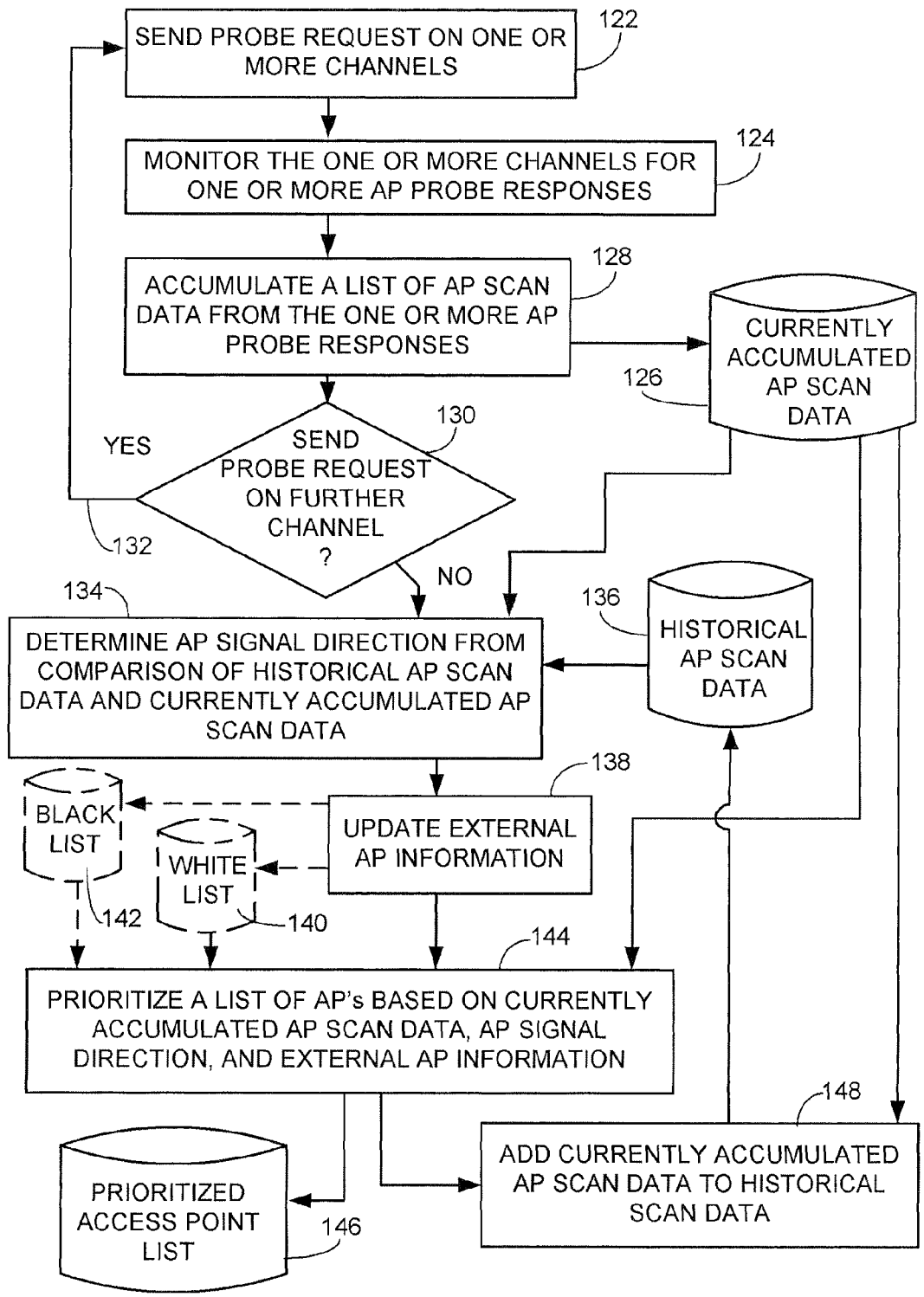
FIG. 5 illustrates one embodiment of a scanning process as part of an embodiment of roaming in a packet communication system.

FIG. 5 illustrates one embodiment of a scanning process as part of an embodiment of roaming in a packet communication system. Recall that the scanning process occurs independently from the connection process. A probe request frame is sent 122 on one or more channels by the mobile phone. The mobile phone monitors 124 the one or more channels for one or more probe response frames sent by one or more available AP's. In addition to the RSSI which the mobile phone can associate with each probe response frame (and therefore with each AP), the probe response frame from a particular AP may have other useful information, such as, for example, a service set identifier (SSID) for the AP; a time stamp field so the clock of the client (mobile phone) can be synchronized with the clock of the AP if desired; a capability information field; a list of supported data rates; a physical parameter set element which can be useful for telling if the AP uses direct sequence or frequency hopping; and a MAC address and/or SSID for the AP which can be used to determine if a new IP address will be needed if transferring to the AP. The mobile phone may also associate a signal noise level with each probe response frame (and therefore with each AP). A list of current AP scan data 126 is accumulated 128 from the one or more AP probe responses. Depending on whether or not the mobile phone has the ability to send multiple probe requests at once, the mobile phone may decide 130 whether or not to send a probe request on a further channel. If more requests will be sent 132, step 122 can be returned-to. Otherwise, the mobile phone can move on to the prioritizing actions, and determine an AP signal direction 134 (for example, increasing, decreasing, or steady) based on a comparison of historical AP scan data 136 and currently accumulated AP scan data 126. The signal direction can be determined for each of the available AP's identified by the probe responses. Similarly, a signal noise direction can be determined for each of the available AP's identified by the probe responses. The comparison of the currently accumulated AP scan data with the historical AP scan data 136 can also be used to determine whether or not a given AP is appearing for the first time, for example if there is no history or no current history for the AP.

As a result of the previous actions, the mobile phone is able to identify some useful parameters which can be used in AP prioritization if desired along with RSSI. Some of these useful parameters may include, but are not limited to:
  AP signal direction;
  AP noise direction;
  one or more historical AP parameters;
  if an AP has no history;
  SSID for the AP;
  data rate supported by the AP; and
  if a new IP address will be needed by the mobile phone when connecting to the AP.

Figure 2:
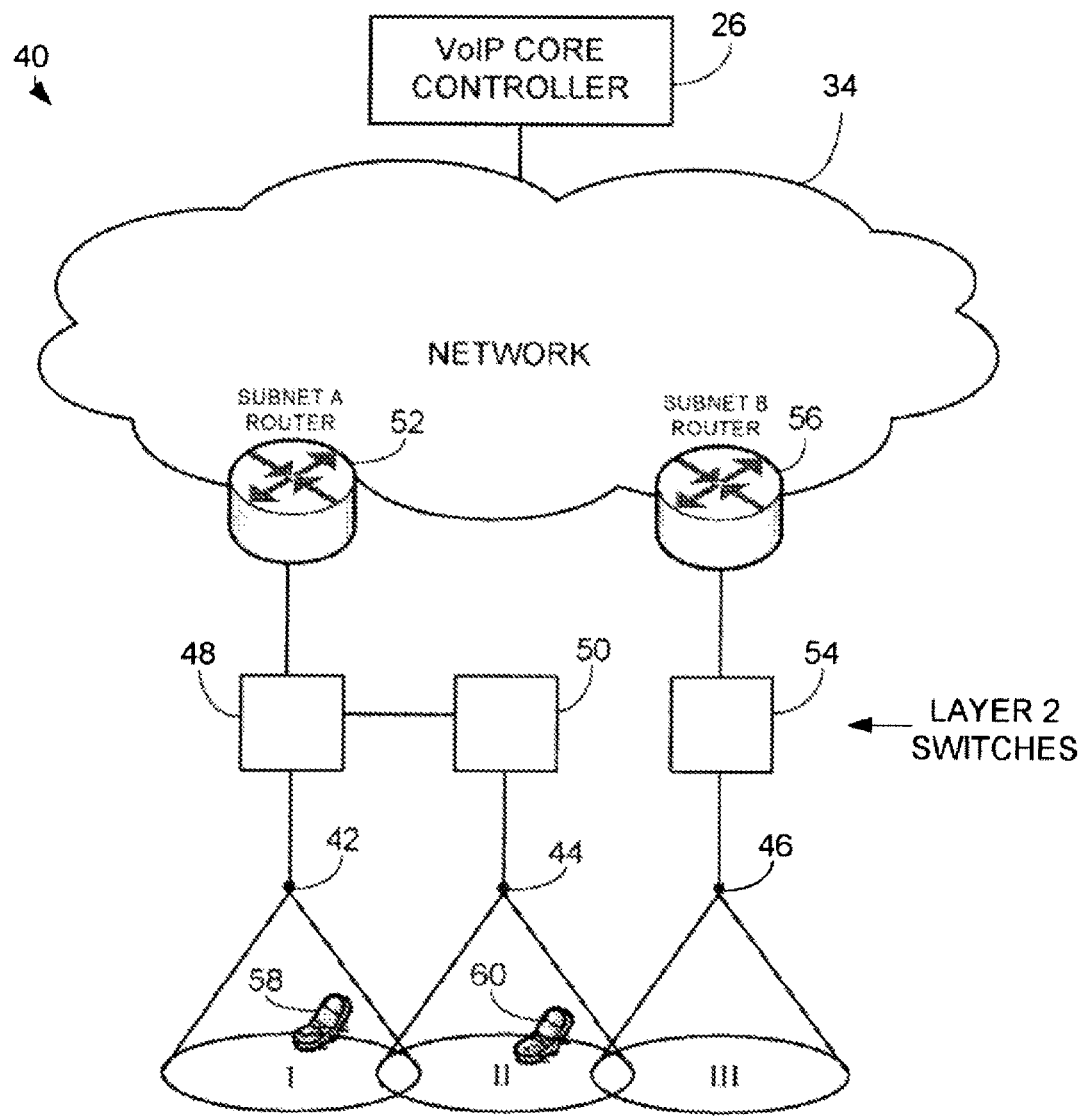
FIG. 2 schematically illustrates another embodiment of a VoIP system.
Figure 3:
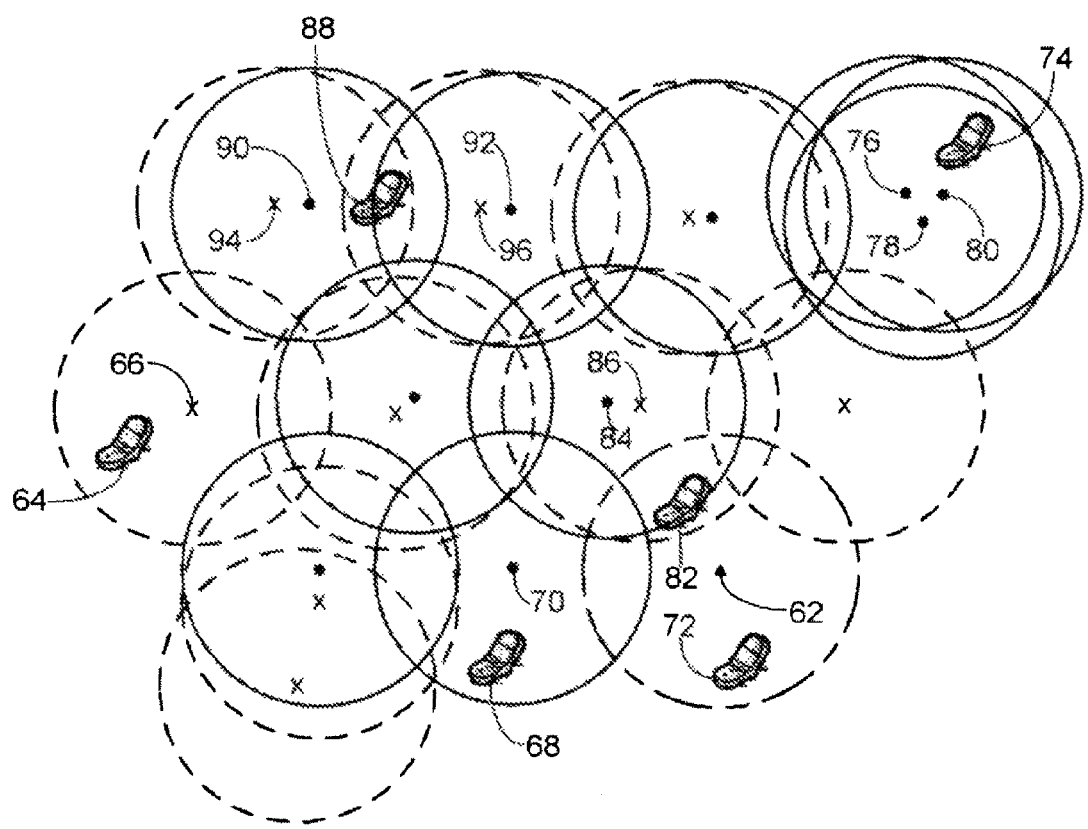
FIG. 3 schematically illustrates one embodiment of distributed access points (AP's) for multiple service providers and their corresponding coverage areas.

The mobile phone may also obtain additional information by updating external AP information 138. The external information may be provided by one or more VoIP or WiFi core processors. Again, for simplicity, a VoIP core processor will be referred-to, although it should be understood that the core processor could be a WiFi core processor as well. Each VoIP core processor (as discussed in the embodiments of FIGS. 1 and 2) is coupled to the AP's which are part of its VoIP system. As such, the VoIP core processor can monitor performance information related to the AP's, such as, for example:
  the number of users on each AP;
  how much bandwidth is being used by each AP;
  whether each AP is intact or faulty; and the number of retransmissions for each AP being considered.

Based on this knowledge, the VoIP core processor can prepare a white list 140 of recommended AP's. AP's with higher priority on the white list might be determined to spread user traffic out, especially in highly overlapped coverage areas to avoid having one AP get the bulk of the traffic. The VoIP core processor can also prepare a black list 142 which could be a list of blocked AP's which are not recommended to be connected-to. In the embodiment of FIG. 5, the white list 140 and the black list 142 are shown with dashed lines because both lists 140, 142 are not required in every embodiment. The external information which is updated 138 can be a black list 142 only, a white list 140 only, or both a black list 142 and a white list 140. Optionally, the updated external information may also include a command for the mobile phone to execute. Examples of possible commands include: a command to leave the current AP (for example if the VoIP core controller would like to rebalance the AP loads); a command to move to a specific AP; a command to execute roaming; or even a command to pass information on to the server (for example scan information). Next, the mobile phone can prioritize 144 a list 146 of AP's based on currently accumulated AP scan data 126, AP signal direction, and external AP information. One example of a prioritization might be to order the AP's based on giving higher priority to AP's which satisfy more of the following criteria:

the considered AP is not busy
the considered AP has an increasing RSSI compared to a previous scan
the considered AP has RSSI at or above a desired threshold;
the considered AP has a decreasing noise level;
the considered AP is an intact AP
the considered AP has historical AP scan data
the considered AP has noise and/or interference levels which are at or below a desired threshold
the considered AP does not require a layer three network address change (does not require a new IP address)
the considered AP is on a white list
the considered AP is not on a black list
a command has been received to move to the considered AP Finally, the currently accumulated AP scan data can be added 148 to the historical AP scan data. This addition can be a true addition while not throwing any of the previous historical AP scan data away, or it can be an addition of new data while removing some or all of the previous historical AP scan data.

Figure 6:
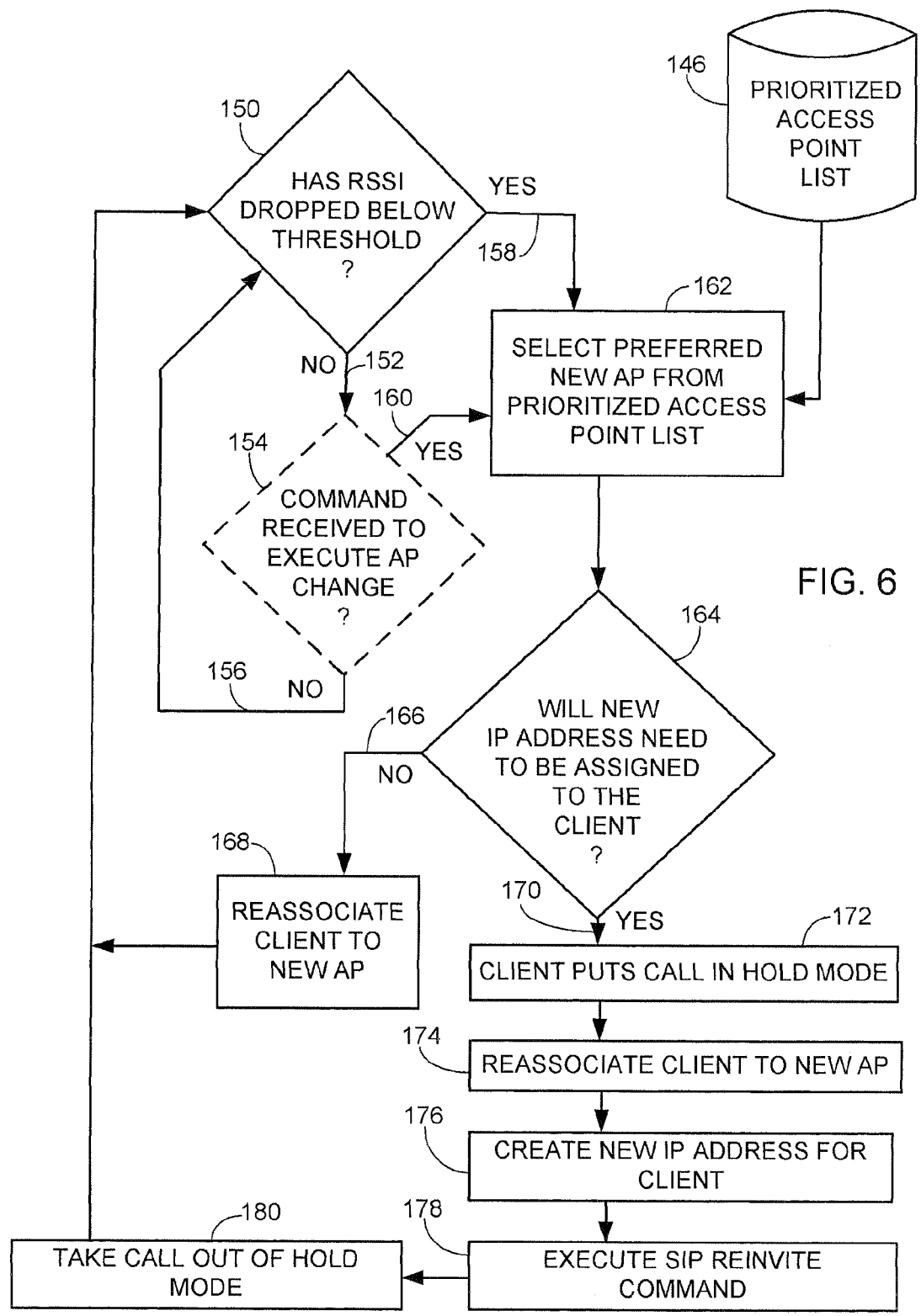
FIG. 6 illustrates one embodiment of a connection process as part of an embodiment of roaming in a packet communication system.

FIG. 6 illustrates one embodiment of a connection process as part of an embodiment of roaming in a packet communication system. Recall that the connection process occurs independently from the scanning process. In the connection process, a decision needs to be made on whether to roam from an existing AP to a new AP. In this embodiment, a determination 150 is made on whether RSSI has dropped below a roaming RSSI threshold. If the RSSI has not 152 dropped below the roaming RSSI threshold, then an optional determination 154 can be made of whether a command has been received to execute an AP change. It has been discussed above with regard to FIG. 5 that an optional part of the updating of external information which can occur during the scanning process can include receiving commands to leave the current AP; move to a specific AP; or execute the roaming process. Returning to FIG. 6, if no command has been received to execute an AP change 156, the connection process returns to step 150. Alternatively, if a determination is made 158 that RSSI has dropped below a threshold, or if a command has been received 160 to execute an AP change, then in either of these cases, a decision is made to roam from the existing AP to a new AP. When this decision is made to roam, a preferred new AP is selected 162 from the prioritized access list 146. Based on the MAC address or SSID of the preferred new AP, a determination 164 can be made if a new IP address needs to be assigned to the client. If a new IP address will not be needed 166 (the layer 3 network address will be the same), then the client (in this example, a mobile phone) can be reassociated 168 to the new AP. If a new IP address will be needed 170, then the client (in this example, the mobile phone) puts the call in a SIP hold mode 172, notifying the handset at the other end and/or the VoIP core network that an IP change is being executed. The client reassociates 174 to the new AP. A new IP address is created 176 for the client. The IP address has four numbers separated by dots. One non-limiting example of how the new IP address may be created for the client is to leave the first number of the new IP address the same as the first number of the old IP address. The second number of the new IP address may be taken from the current SSID. The third and fourth numbers may be generated based on the MAC address of the client. A SIP reinvite command is executed 178, and the call is taken out of SIP hold mode 180.

The advantages of a packet communication roaming system and method have been discussed herein. Embodiments discussed have been described by way of example in this specification. It will be apparent to those skilled in the art that the forgoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. Additionally, the recited order of processing elements or sequences, or the use of numbers, letters, or other designations therefore, is not intended to limit the claims to any order, except as may be specified in the claims. Accordingly, the invention is limited only by the following claims and equivalents thereto.

What is claimed is:

1. A method of roaming in a packet communication system during a call, comprising:
   a) in a scanning process:
      i) scanning for one or more available access points (AP's); and
      ii) prioritizing the one or more available AP's into a prioritized AP list based
      on at least one criterion in addition to a received signal strength indicator (RSSI); and
   b) in a connection process:
      i) making a decision to roam from an existing AP to a new AP; and
      ii) connecting to the new AP, wherein the new AP is selected from the prioritized AP list, and wherein connecting to the new AP, comprises:
         determining if a new IP address will need to be assigned to a client;
         if the new IP address does not need to be assigned to the client, then reassociating the client to the new AP; and
         if the new IP address does need to be assigned to the client, then:
            putting the call in a hold mode;
            reassociating the client to the new AP;
            creating the new IP address for the client;
            executing a SIP reinvite command; and
            taking the call out of the hold mode.

2. The method of claim 1, wherein the scanning process occurs in parallel with data and/or voice communications of the call.

3. The method of claim 1, wherein the scanning process occurs in multiplexed fashion with data and/or voice communications of the call.

4. The method of claim 1, wherein scanning for one or more available AP's comprises:
sending a probe request on one or more channels;
monitoring the one or more channels for one or more probe responses from the one or more available AP's; and
accumulating current AP scan data from the one or more AP probe responses.

5. The method of claim 4, further comprising determining an AP noise direction for one or more available AP's by comparing historical AP scan data with the currently accumulated AP scan data, and wherein prioritizing the one or more available AP's into a prioritized AP list based on at least one criterion in addition to RSSI comprises prioritizing the one or more available AP's based at least on RSSI and the AP noise direction.

6. The method of claim 4, further comprising:
determining an AP signal direction for one or more available AP's by comparing historical AP scan data with the currently accumulated AP scan data; and
wherein prioritizing the one or more available AP's into the prioritized AP list based on at least one criterion in addition to RSSI comprises prioritizing the one or more available AP's based on at least RSSI and the AP signal direction.

7. The method of claim 6, further comprising updating external AP information.

8. The method of claim 7, wherein updating external AP information comprises at least one of:
receiving a black list; and
receiving a white list.

9. The method of claim 8, wherein:
the black list comprises a list of blocked AP's which are not recommended to be connected-to; and
the white list comprises a list of recommended AP's.

10. The method of claim 9, wherein the black list and the white list are generated based on a criterion selected from the group consisting of:
an assessment of how much bandwidth is being used by each AP being considered;
an assessment of whether each AP being considered is intact;
an assessment of a number of users on each AP being considered; and
an assessment of a number of retransmissions for each AP being considered.

11. The method of claim 8, wherein prioritizing the one or more available AP's into the prioritized AP list based on at least one criterion in addition to RSSI comprises prioritizing a list of AP's based on:
the currently accumulated AP scan data;
the AP signal direction for the one or more available AP's; and
the external AP information.

12. The method of claim 11, wherein:
the currently accumulated AP scan data comprises:
RSSI for one or more currently available AP's;
a noise and/or interference level for one or more currently available AP's;
an indication of whether or not there is historical AP scan data for one or more currently available AP's;
a service set identifier (SSID) for one or more currently available AP's;
a capability information field for one or more currently available AP's;
supported data rates for one or more currently available AP's; and
a physical parameter set element for one or more currently available AP's.

13. The method of claim 1, wherein prioritizing the one or more available AP's into a prioritized AP list further comprises sorting the one or more available AP's, giving higher priority to a considered AP, from the one or more available AP's, which satisfies more of the following criteria:
the considered AP is not busy;
the considered AP has an increasing RSSI compared to a previous scan;
the considered AP has RSSI at or above a desired threshold;
the considered AP has a decreasing noise level;
the considered AP is an intact AP;
the considered AP has historical AP scan data;
the considered AP has noise and/or interference levels which are at or below a desired threshold;
the considered AP does not require an IP address change;
the considered AP is on a white list;
the considered AP is not on a black list; and
a command has been received to move to the considered AP.

14. The method of claim 13, wherein the considered AP is discarded from the prioritized AP list if the considered AP has no historical AP scan data.

15. The method of claim 1, wherein making the decision to roam from the existing AP to the new access point comprises:
determining that an RSSI for the existing AP has dropped below a roaming RSSI threshold; or
determining that a command to execute an AP change has been received.

16. The method of claim 1, wherein the new AP is selected from the prioritized AP list by selecting a highest priority AP from the prioritized AP list.

17. A system for packet communication, comprising:
a) a plurality of access points (AP's);
b) a core processor coupled to the plurality of AP's, and configured:
i) to maintain performance information about the plurality of AP's; and
ii) to create at least one performance-based-list selected from the group consisting of:
a black list comprising one or more AP's which have undesirable performance information; and
a white list comprising one or more AP's which have desirable performance information; and
c) a mobile phone configured:
i) to connect to at least one of the plurality of AP's at a time;
ii) while in a call, to execute a scanning process comprising:
scanning for one or more available AP's; and
prioritizing the one or more available AP's into a prioritized AP list based at least on RSSI and the performance-based-list; and
iii) while in the call, to execute a connection process comprising:
making a decision to roam from an existing AP to a new AP; and
connecting to the new AP, wherein the new AP is selected from the prioritized AP list, and wherein connecting to the new AR, comprises:

determining if a new IP address will need to be assigned to a client:
if the new IP address does not need to be assigned to the client, then reassociating the client to the new AP; and
if the new IP address does need to be assigned to the client, then:
putting the call in a hold mode;
reassociating the client to the new AP;
creating the new IP address for the client;
executing a SIP reinvite command; and
taking the call out of the hold mode.

18. A method of roaming in a packet communication system during a call, comprising:
a) in a scanning process:
  i) sending an access point (AP) probe request on one or more channels;
  ii) monitoring the one or more channels for one or more AP probe responses from one or more available AP's;
  iii) accumulating a current list of AP scan data from the one or more AP probe responses;
  iv) determining an AP signal direction for each of the available AP's based on a comparison of historical AP scan data and currently accumulated AP scan data;
  v) updating external AP information by receiving a black list and a white list, wherein the black list comprises a list of blocked AP's which are not recommended for connection, and wherein the white list comprises a list of recommended AP's;
  vi) prioritizing a list of AP's based on currently accumulated AP scan data, AP signal direction, and external AP information; and
b) in a connection process, if a received signal strength indication (RSSI) has dropped below a roaming RSSI threshold or if a command to execute an AP change has been received, then:
  i) selecting a preferred new AP from the prioritized AP list;
  ii) determining if a new IP address will need to be assigned to a client;
  iii) if the new IP address does not need to be assigned to the client, then reassociating the client to the new AP; and
  iv) if the new IP address does need to be assigned to the client, then:
    putting the call in a hold mode;
    reassociating the client to the new AP;
    creating the new IP address for the client;
    executing a SIP reinvite command; and
    taking the call out of the hold mode.

* * * * *